US011013646B2

(12) United States Patent
Carletti

(10) Patent No.: US 11,013,646 B2
(45) Date of Patent: May 25, 2021

(54) LOADING PLATFORM ALIGNMENT SYSTEM AND LOADING/UNLOADING METHOD THEREOF

(71) Applicant: Ferno-Washington, Inc., Wilmington, OH (US)

(72) Inventor: Enrico Carletti, Pieve di Cento (IT)

(73) Assignee: Ferno-Washington, Inc., Wilmington, OH (US)

( * ) Notice: Subject to any disclaimer, the term of this patent is extended or adjusted under 35 U.S.C. 154(b) by 1 day.

(21) Appl. No.: 16/695,604

(22) Filed: Nov. 26, 2019

(65) Prior Publication Data

US 2020/0197243 A1 Jun. 25, 2020

Related U.S. Application Data

(63) Continuation of application No. 15/301,862, filed as application No. PCT/US2015/025939 on Apr. 15, 2015, now Pat. No. 10,512,571.

(Continued)

(51) Int. Cl.
*A61G 3/02* (2006.01)
*A61G 1/02* (2006.01)
(Continued)

(52) U.S. Cl.
CPC ............ *A61G 3/029* (2013.01); *A61G 1/0262* (2013.01); *A61G 1/06* (2013.01); *A61G 3/0227* (2013.01); *A61G 3/0236* (2013.01); *A61G 3/0245* (2013.01); *A61G 3/0272* (2013.01); *B60P 1/4442* (2013.01); *B60P 1/4471* (2013.01);

(Continued)

(58) Field of Classification Search
CPC .... A61G 3/029; A61G 3/0277; A61G 3/0236; A61G 3/0245; A61G 1/0262; A61G 1/06; A61G 2203/10; A61G 2205/40; B60P 1/4442; B60P 1/4471; B60R 1/00; B60Y 2200/49
See application file for complete search history.

(56) References Cited

U.S. PATENT DOCUMENTS

| 4,037,871 A | 7/1977 | Bourgraf et al. |
| 4,192,541 A | 3/1980 | Ferneau |

(Continued)

FOREIGN PATENT DOCUMENTS

| AU | 2008216990 A1 | 4/2009 |
| DE | 102008005900 A1 | 7/2009 |

(Continued)

*Primary Examiner* — Saul Rodriguez
*Assistant Examiner* — Ashley K Romano
(74) *Attorney, Agent, or Firm* — Dinsmore & Shohl, LLP

(57) ABSTRACT

A method and an alignment system which auto-levels and/or auto-centers a loading platform to load and unload a wheeled stretcher to and from an emergency transport vehicle are disclosed. A controller of the alignment system receives a command to extend the loading platform from the emergency vehicle and extends the loading platform under power from the emergency transport vehicle. The controller recognizes an approaching wheeled stretcher, and aligns automatically the loading platform with a leading edge of the approaching wheeled stretcher to compensate automatically for any alignment issues between the loading platform and loading wheels of the wheeled stretcher.

12 Claims, 11 Drawing Sheets

Related U.S. Application Data

(60) Provisional application No. 61/983,508, filed on Apr. 24, 2014.

(51) Int. Cl.
*A61G 1/06* (2006.01)
*B60P 1/44* (2006.01)
*B60R 1/00* (2006.01)

(52) U.S. Cl.
CPC ............ B60R 1/00 (2013.01); *A61G 2203/10* (2013.01); *A61G 2205/40* (2013.01); *B60Y 2200/49* (2013.01)

(56) References Cited

U.S. PATENT DOCUMENTS

| | | | |
|---|---|---|---|
| 4,767,148 | A | 8/1988 | Ferneau et al. |
| 4,921,295 | A | 5/1990 | Stollenwerk |
| 5,205,601 | A | 4/1993 | Ferris |
| 5,913,559 | A | 6/1999 | Sexton et al. |
| 6,203,085 | B1 | 3/2001 | Ferris |
| 6,701,545 | B1 | 3/2004 | Ferneau et al. |
| 6,735,794 | B1 | 5/2004 | Way et al. |
| 7,409,734 | B2 | 8/2008 | Benedict et al. |
| 7,631,373 | B2 | 12/2009 | Broadley et al. |
| 7,996,939 | B2 | 8/2011 | Benedict et al. |
| 8,096,005 | B2 * | 1/2012 | Carletti .................. A61G 1/06 5/86.1 |
| 8,308,212 | B2 | 11/2012 | Schrand |
| 8,439,416 | B2 * | 5/2013 | Lambarth ............... A61G 1/02 296/20 |
| 8,555,433 | B2 * | 10/2013 | Carletti ................... B60K 1/00 180/65.1 |
| 8,864,205 | B2 * | 10/2014 | Lemire ................ A61G 1/0268 296/20 |
| 9,038,218 | B1 * | 5/2015 | Heil ....................... A61G 5/006 5/618 |
| 9,125,785 | B2 * | 9/2015 | Trees ................. A63B 23/0405 |
| 9,132,051 | B2 * | 9/2015 | Heil ...................... A61G 7/015 |
| 9,248,062 | B2 | 2/2016 | Valentino et al. |
| 9,510,982 | B2 | 12/2016 | Valentino et al. |
| 9,833,366 | B2 * | 12/2017 | DeLuca ................ A61G 7/012 |
| 9,966,997 | B2 * | 5/2018 | Hayes .................. H04B 5/0037 |
| 9,999,555 | B2 | 6/2018 | Magill et al. |
| 10,004,651 | B2 * | 6/2018 | DeLuca ............... A61G 1/0243 |
| 10,045,894 | B2 | 8/2018 | Magill et al. |
| 10,117,794 | B2 * | 11/2018 | Bourgraf ............. A61G 1/0243 |
| 10,512,571 | B2 * | 12/2019 | Carletti ............... A61G 3/0236 |
| 10,568,792 | B2 * | 2/2020 | Derenne ............. A61G 1/0281 |
| 10,588,802 | B2 * | 3/2020 | Wiggermann ....... A61G 7/0527 |
| 2011/0080016 | A1 | 4/2011 | Lambarth et al. |
| 2012/0117730 | A1 | 5/2012 | Lemire et al. |
| 2012/0237326 | A1 | 9/2012 | Van Ness |
| 2013/0168987 | A1 | 7/2013 | Valentino et al. |

FOREIGN PATENT DOCUMENTS

| | | |
|---|---|---|
| DE | 102010027207 A1 | 1/2012 |
| DE | 102011078803 A1 | 1/2013 |
| JP | 10277095 A | 10/1998 |

\* cited by examiner

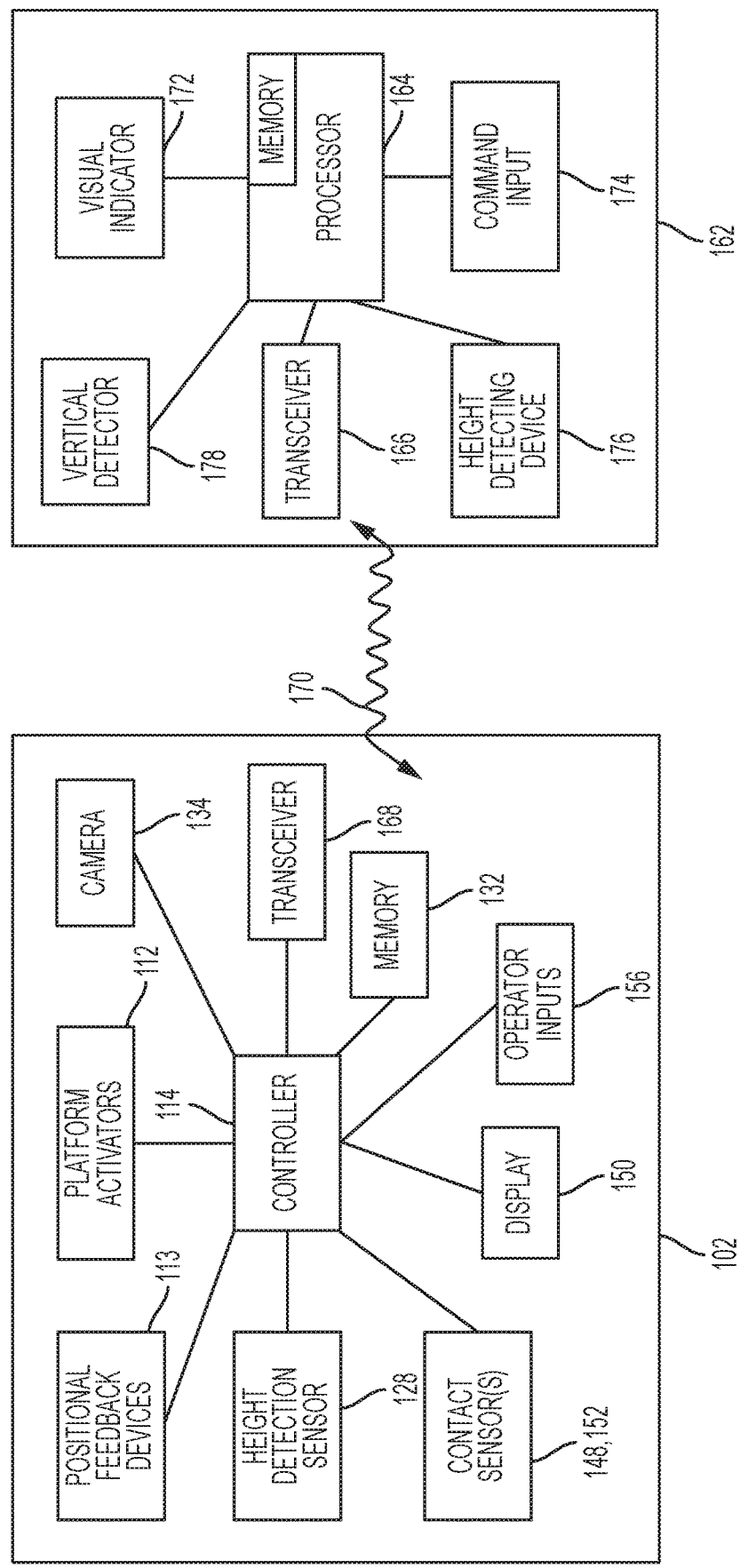

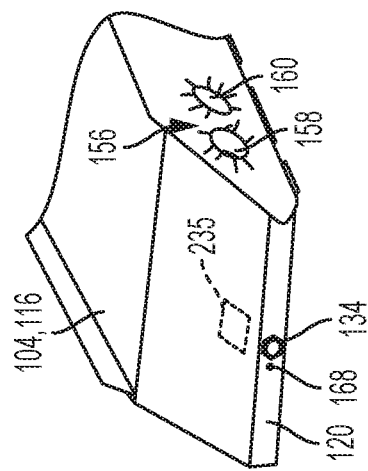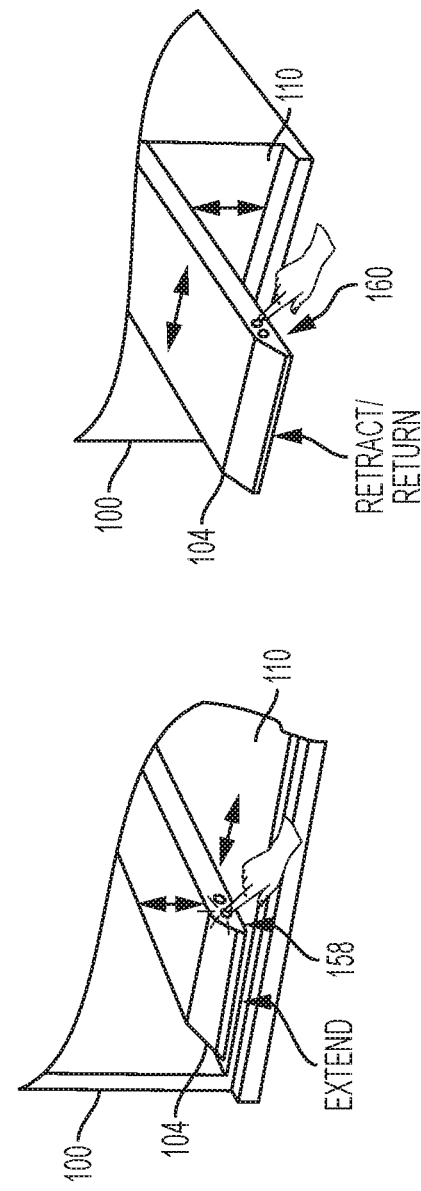

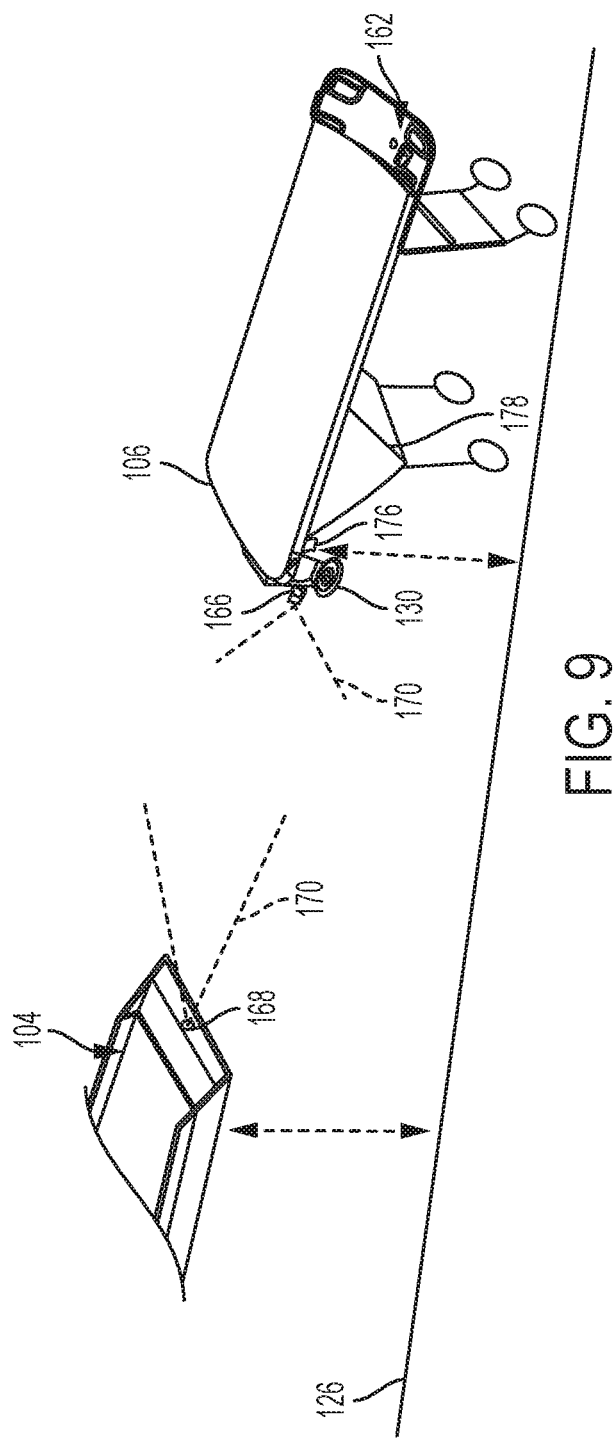
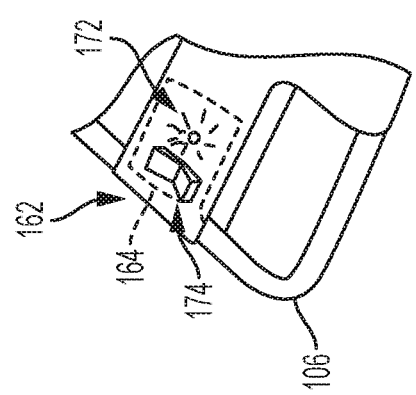
FIG. 9
FIG. 10

LOADING PLATFORM ALIGNMENT SYSTEM AND LOADING/UNLOADING METHOD THEREOF

CROSS-REFERENCE TO RELATED APPLICATIONS

This application is a continuation of co-pending (and now allowed) U.S. patent application Ser. No. 15/301,862 of the same title and that was filed on Oct. 4, 2016 that claims priority to Patent Cooperation Treaty Application PCT/US2015/025939 of the same title and that was filed on Apr. 15, 2019 that claims priority to U.S. Provisional Patent Application No. 61/983,508 of the same title and that was filed on Apr. 24, 2014.

TECHNICAL FIELD

The present disclosure relates generally to supporting platforms, and particularly to a loading platform alignment system for loading and unloading a wheeled stretcher to and from an emergency transport vehicle.

BACKGROUND

Loading a wheeled stretcher that is carrying a patient into an emergency transport vehicle, such as an ambulance, helicopter, or sprinter van, can sometimes be difficult for the emergency responders and/or medical personnel on scene. During loading, the wheeled stretcher may be out of alignment with a transport surface of the transport vehicle upon which the wheeled stretcher will be placed. For example, the transport surface could be on a different incline and/or higher/lower than the stretcher. If the stretcher and the transport surface are not in alignment, loading of the stretcher can take additional effort and time to ensure that the stretcher is properly arranged and secured inside the transport vehicle. Operators may have to provide additional force or push the stretcher to center the stretcher within the transport vehicle. This pushing may force the operators into unsafe positions, where the operator may be subject to back pain and spine problems. Further, the operators may have to check that the stretcher is properly centered. The operators again may be at risk of back injury or spine problems. Additionally, if out of alignment during unloading, one or more legs of the wheeled stretcher may not unfold/open completely, thereby possibly causing the stretcher to collapse and/or have to be lifted by attending personnel to ensure that all the legs have fully unfolded/opened properly to support the stretcher in an upright position.

SUMMARY

It is against the above background that embodiments, according to the present invention, provide an alignment system having an automatically adjusting loading platform that addresses the above noted problems. For example, in one embodiment, an alignment system which auto-levels and/or auto-centers a loading platform to load and unload a wheeled stretcher to and from an emergency transport vehicle is disclosed. In another disclosed embodiment, the alignment system may recognize an approaching wheeled stretcher and then align the loading platform automatically with a leading edge of the stretcher. This automatic alignment makes transference of the stretcher onto the platform much simpler as the position of the loading wheels of the stretcher is processor controlled to land leveled and/or centered to an end surface portion of the loading platform. It is to be appreciated that the alignment system has compensated automatically for any alignment issues between the loading platform and the loading wheel, which if not corrected could make loading the stretcher into the transport vehicle otherwise difficult for the emergency responders and/or medical personnel on scene. Once the stretcher is loaded onto the loading platform, the alignment system may then be commanded to transition the loading platform to a transport position within the transport vehicle. The alignment system may then be used similarly for unloading the stretcher from the vehicle. After the alignment system has been commanded to extend the platform from the transport vehicle to an extended position, the alignment system then automatically adjusts the platform to be at the right height and orientation such that the legs of the stretcher properly unfold fully and land level with the ground, thereby eliminating the need for attending personal to have to lift the stretcher when unloading the stretcher onto an uneven surface in order to ensure that all the legs have fully unfolded/opened properly to support the stretcher in the upright position.

In another embodiment, a method of loading a wheeled stretcher onto a loading platform provided in an emergency transport vehicle is disclosed. The method may comprise receiving by a controller of an alignment system a command to extend a loading platform of the alignment system from the emergency vehicle and extending the loading platform from the emergency transport vehicle under power from the emergency transport vehicle; recognizing via the controller of the alignment system an approaching wheeled stretcher; and aligning automatically the loading platform with a leading edge of the approaching wheeled stretcher via controller of the alignment system auto-leveling and/or auto-centering the loading platform, under power from the emergency transport vehicle, to the leading edge of the approaching wheeled stretcher. The method may further comprise loading the wheeled stretcher onto the loading platform wherein the automatic alignment lands loading wheels of the wheeled stretcher leveled and/or centered to an end surface portion of the loading platform. The method may further comprise automatically determining via the controller of the alignment system whether an upper support surface of the loading platform is extended beyond an extremity of the emergency transport vehicle before aligning automatically the loading platform with a leading edge of the approaching wheeled stretcher. The recognizing via the controller of the alignment system of the approaching wheeled stretcher may be performed by capturing, via a camera of the alignment system, an image of one or more targets provided on the wheeled stretcher in an auto tracking window of the alignment system. After capturing the image of the one or more target, the method may further comprise, via the controller of the alignment system, automatically calculating a difference between height and orientation of a reference line in the auto tracking window to height and orientation of the one or more targets in the image captured in the auto tracking window, and automatically pitching, tilting, raising and/or lowering the loading platform such that the reference line, which corresponds to an end of the loading platform, is level with the one or more targets and/or the one or more targets are centered in the auto tracking window. The method may further comprise automatically ceasing the automatic alignment upon the wheeled stretcher contacting the loading platform. After contact is made between the wheeled stretcher and the loading platform, the method may further comprise raising automatically via the controller of the alignment system an end the loading platform under power from the emergency transport vehicle. The method may further comprise receiving by the controller of the alignment system a command to retract the loading platform into the emergency vehicle and retracting the loading platform into the emergency vehicle under power from the emergency vehicle. The method may further comprise receiving by the controller of the alignment system another command to extend the loading platform from the emergency vehicle; extending the loading platform from the emergency vehicle under power from the emergency vehicle; and unloading the wheeled stretcher from the loading platform. When an upper support surface of the loading platform is extended from the emergency transport vehicle, the method may further comprise automatically adjusting via the controller of the alignment system the loading platform to be at a height and orientation such that legs of the wheeled stretcher will unfold fully and land level with the ground during unloading.

In still another embodiment, an alignment system for loading a wheeled stretcher into an emergency transport vehicle is disclosed. The alignment system may comprise a loading platform movable under power and providable within the emergency transport vehicle; a memory with program instructions; a controller communicatively coupled to the memory, wherein the loading platform is movable under the control of the controller, and wherein the program instructions when read from memory and executed by the controller cause the controller to extend the loading platform and automatically align height and/or orientation of the loading platform with one or more targets provided on the wheeled stretcher. The loading platform may be made moveable via actuators under the control of the controller. The method may further comprise a height detection sensor communicatively coupled to the controller and provided adjacent an end of the loading platform to detect a height of the loading platform above ground. The alignment system may further comprise operator inputs provided on at least one of the loading platform, the wheeled stretcher, and the emergency transport vehicle to send a command to the controller to extend or retract the loading platform, and contact sensor which when contacted cease the automatic align of the height and/or orientation of the loading platform with the one or more targets provided on the wheeled stretcher. The alignment system may further comprise a camera to capture an image of the target in an auto tracking window. The controller may be communicatively coupled to the camera to receive the image and determine a difference between height and orientation of a reference line in the auto tracking window to height and orientation of the image of the one or more targets, and automatically pitch, tilt, raise and/or lower the loading platform to align the reference line, which corresponds to an end of the loading platform, with the one or more targets and/or to center the one or more targets in the auto tracking window.

In yet another embodiment, the above method may be embodiment on a non-transitory computer readable medium with program instructions that when read and executed by a processor causes the processor to extend a loading platform and align height and/or orientation of the loading platform, via actuators, with a target provided on a wheeled stretcher.

These and other features and advantages of the various embodiments of the present invention will become apparent from the following detailed description, and the accompanying drawings.

BRIEF DESCRIPTION OF THE DRAWINGS

FIGS. 4A-4B is a system diagram of an alignment system according to FIGS. 1-3, which automatically positions in height and/or orientation a loading platform for a wheeled stretcher in communications with a recognition/control device provided, e.g., on the wheeled stretcher.

FIGS. 5A-5C are depictions of the a user-interface of the alignment system according to FIGS. 1-3 in which to manually command the extending and retracting of the loading platform, wherein FIG. 5A is a close-up and FIGS. 5B-5C are illustrations showing the commanding of the extending and retracting, respectfully, of the loading platform of the alignment system depicted by FIG. 1.

FIG. 9 is an illustration of a form of communication between the alignment system of FIGS. 1-3 and a wheel stretcher according to another embodiment of the invention.

FIG. 10 is a close-up illustration of a remote user-interface, i.e., a recognition/control device, of the alignment system according to FIG. 1-3 provided to a wheel stretcher which can be used to manually and wirelessly control/command the centering and leveling of the loading platform.

Like reference symbols in the various drawings indicate like elements.

DETAILED DESCRIPTION

Figure 1:
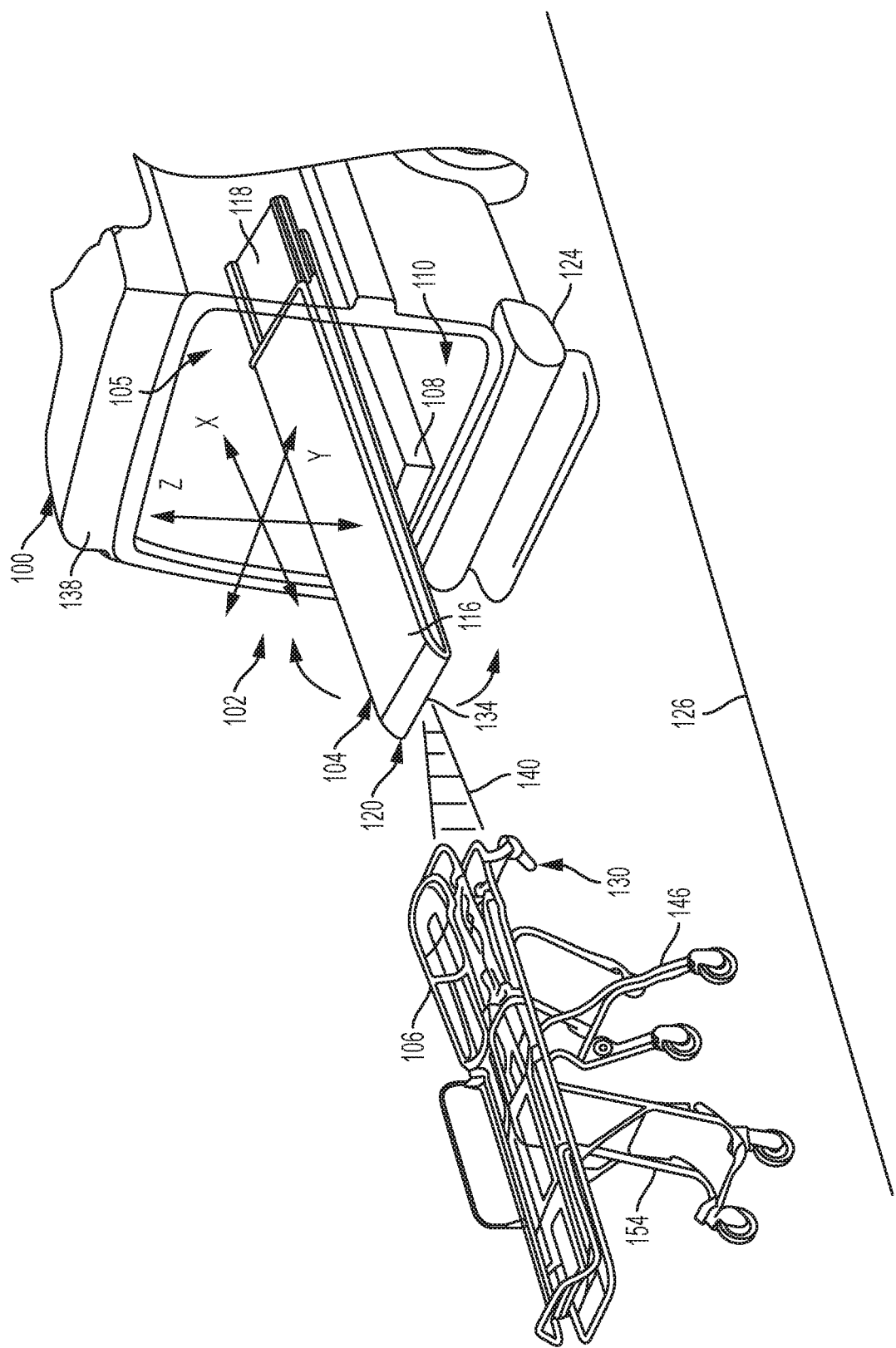
FIG. 1 is an illustration showing an alignment system with a loading platform for use within an emergency transport vehicle to load and unload a wheeled stretcher.
Figure 2:
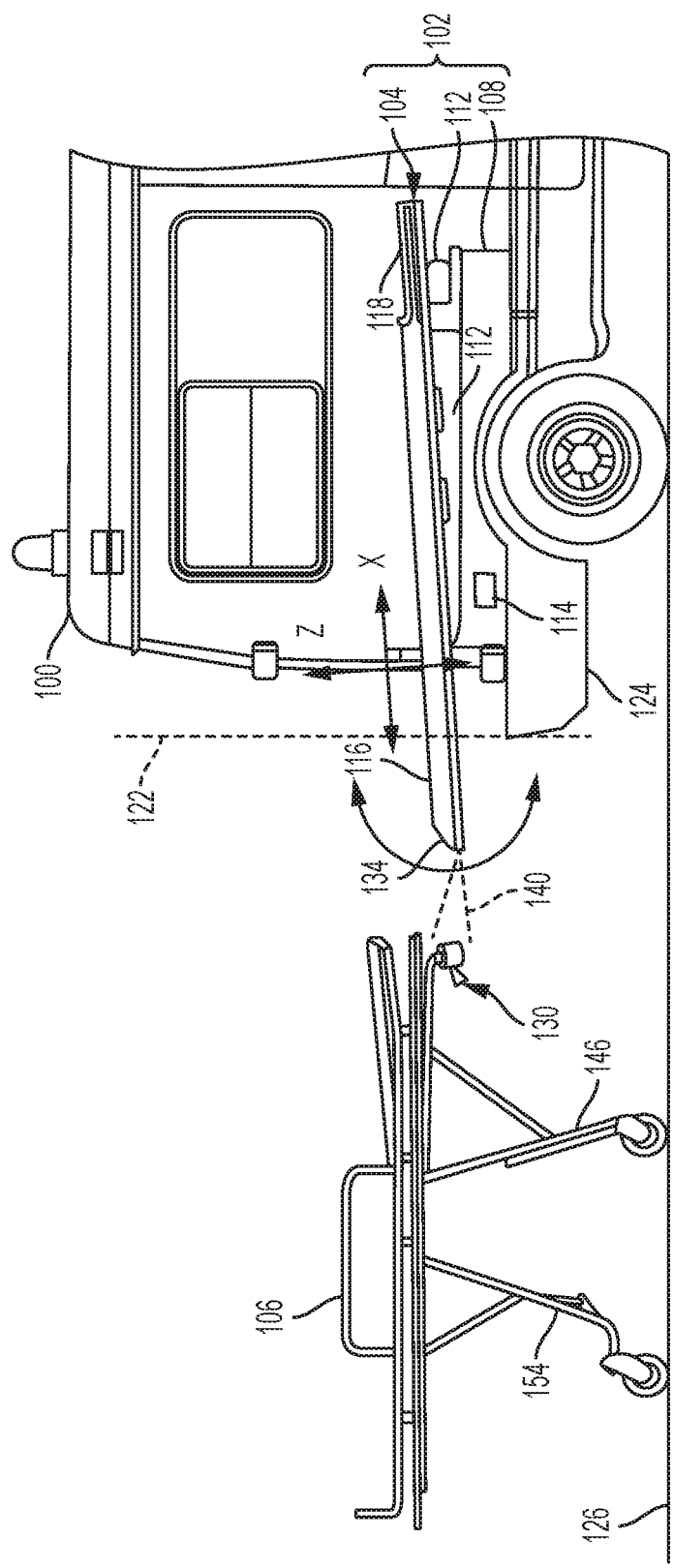
FIG. 2 is an illustration showing another view of the alignment system of FIG. 1 used to load/unload a stretcher to and from the transport vehicle, and further showing the ability for the loading platform to extend past the vertical plane created by a bumper of the transport vehicle.
Figure 3:
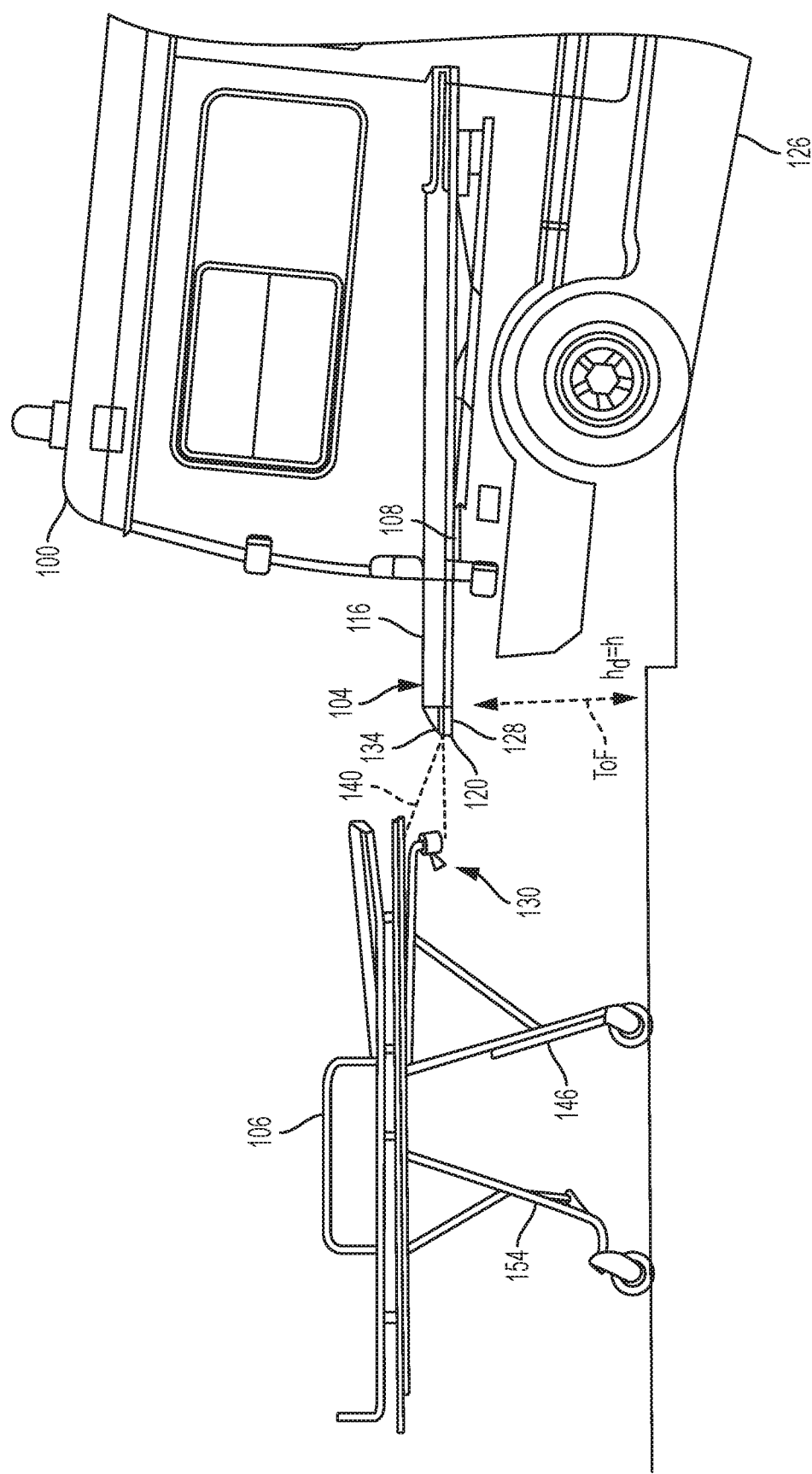
FIG. 3 is an illustration showing the ability for the alignment system of FIGS. 1 and 2 to align the loading platform with the wheeled stretcher on a non-parallel surface.

With reference made to FIGS. 1-3, disclosed is an emergency transport vehicle 100 is provided with an alignment system 102 that positions and orientates a loading platform 104 to facilitate the loading and unloading of a wheeled stretcher 106 thereon. It is to be appreciated that although in the illustrated embodiments, the emergency transport vehicle 100 is depicted as a wheeled transport, such as an ambulance or sprinter van, the alignment system 102 may also be equally usable for loading and unloading the wheeled stretcher 106 to an aircraft, such as a plane or helicopter. Coordinate axes X, Y and/or Z are also depicted in these figures for convenience of discussion. Generally, the loading platform 104 may move with six degrees of freedom, i.e., translate (forward/backward) along the X axis, laterally (side to side) along the Y axis, and vertically (up/down) along the Z axis, as well as rotate about the X-, Y-, and Z-axes, i.e., roll, pitch, and yaw, respectively, all relative to its base 108.

As illustrated, the alignment system 102 comprises the loading platform 104 and the base 108. The loading platform 104 may be made of metal, plastic, wood, composites or any combinations thereof, and dimensioned such that all of the supporting wheels of the wheeled stretcher 106 when in the folded/collapsed position can be supported thereon as well as be accommodated fully within a transport bay 105 of the transport vehicle 100. In one embodiment, the dimensions of the loading platform 104 are 210 cm±10 cm in length, 64 cm±10 cm in width, and 22 cm±10 cm in height (thickness). It is to be appreciated that although the illustrated wheeled stretcher 106 is depicted as a y-frame stretcher, any commercially available medical stretcher, e.g., x-, z-, h-frame stretcher, roll-in cots, etc., that can be rolled onto the loading platform 104 may be used conveniently with the alignment system 102. Suitable wheeled stretchers/ambulance cots are disclosed, for example, by U.S. Pat. Nos. 4,037,871, 4,192,541, 4,767,148, 4,921,295, 6,701,545, 6,735,794, 7,409,734, 7,631,373, and 7,996,939, the disclosures of which are herein fully incorporated by reference.

Additionally, the stretcher 106 may mate with the platform in any way that secures the stretcher 106 to the loading platform 104. For example, the loading platform 104 may be provided with a conventional fastening device (not shown) in which to secure the wheeled stretcher to the loading platform for transportation. Suitable fastening devices are disclosed by U.S. Pat. Nos. 5,205,601, 5,913,559 and 8,308,212, the disclosures of which are herein incorporated fully by reference. The loading platform 104 may include cushioning systems to provide comfortable transport of the patient in the transport vehicle 100. An embodiment of the loading platform 104 may include a data storage system to store information related to the use of the loading platform 104. This information may include usage time and usage statistics, as well as any issues with alignment.

It is to be appreciated that in one embodiment the alignment system 102 with the loading platform 104 and base 108 are provided as a single unit, e.g., as an aftermarket accessory in which the base 108 is mountable and made secured in any conventional fashion, e.g., via bolting, riveting, welding, etc., to a transport surface 110 within the transport bay 105 of the transport vehicle 100. In another embodiment (not depicted), the base 108 of the alignment system 102 may be provided integral to the transport vehicle 100 as part of the manufacturing process, and made a component of transport vehicle's integrated systems, e.g., an embedded base 108 in which the loading platform 104 is a movable portion of the transport bay 105.

With reference made specifically to FIGS. 2 and 4, in order to provide the six degrees of freedom to the loading platform 104, a number of actuators 112 connect the loading platform 104 to the base 108. The actuators 112 may be electrically, pneumatically, and/or hydraulically based linear actuator and/or rotary actuators each of which is controlled together by an included controller 114 of the alignment system 102. The controller 114 in one embodiment may be a general purpose computer or a programmable logic controller (PLC) which coordinates control of the actuators 112, and generally has a microprocessor, a memory 132, and a number of separate input/output (I/O) modules described hereafter. It is to be appreciated that the controller 114 and its memory 132 may also form the data storage system mentioned above.

In one embodiment, the controller 114 controls four actuators arranged below the platform 104. Positional and/or orientation feedback devices 113, such as rotary and linear encoders, switches, relays, lasers, magnets, etc., are used to provide precise positional information to the controller 114 of each actuator 112 such that the location and orientation of the loading platform 104, relative to the base 108, is always known to the controller 114. Power to the actuators 112 and controller 114 of the alignment system 102 may be via an included rechargeable power supply (i.e., batteries), or drawn from the electrical system of the transport vehicle 100 such as via hardwiring to the fuse panel or via a plug connected to an outlet provided with the transport bay 105. Additional functions provided by the controller 114 of the alignment system 102 according to the present invention are described hereafter in later sections.

As depicted best by FIG. 1, the loading platform 104 comprises an upper support surface 116 and a lower support surface 118 to which the upper support surface 116 is slideably connected. In this manner, the upper support surface 116 may be translated forward/backward along the X axis by an actuator (not shown) under the control of the controller 114 relative to the lower support surface 118. In this manner, an end 120 of the upper support surface 116 may be extended outwardly from the transport bay 105 beyond its furthest extremity 122 (FIG. 2), such as for example rear bumper 124, and vice versa as needed. It is to be appreciated that although the upper support surface 116 can be translated along the X-axis, the lower support surface 118 does not move forwards or backwards along the X-axis relative to the base 108. The lower support surface 118 does, however, get acted upon by the associated actuators 112 that are responsible for moving the loading platform relative to the base 108 in the Y- and Z-axes as well as for pitching, rolling, and yawing about the X-, Y-, and Z-axes.

With reference made also to FIGS. 2-4, after a portion of the upper support surface 116 has been extended beyond the furthest extremity 122 (FIG. 2) of the transport vehicle 100, the alignment system 102 initiates a height adjustment of the upper support surface 116. It is to be appreciated that the height adjustment is conducted automatically by the controller 114 to position the end 120 of the upper support surface 116 at a height h above the ground 126. In one embodiment, a height detection device 128, such as for example, an ultrasonic transducer is provided to the upper support surface 116 adjacent the end 120 such that it has a clear view of the ground 126 underneath it. In one embodiment, an ultrasonic transducer, provided as the height detection device 128, is provided on or about the centerline of the upper support surface 116. In such an embodiment, as is well known, the ultrasonic transducer measures distance via measuring the time elapsing between emitting an ultrasonic pulse and detecting an echo return, e.g., from the ground 126. This measurement is called the Time-of-Flight (ToF), in which the ultrasonic transducer provides the controller 114 with a ToF signal. The controller 114 then uses the ToF signal to calculate a detected height $h_d$ of the end 120 above the ground 126. The controller 114 then activates the necessary actuators 112 to adjust the end 120 such that the detected height $h_d$ is equal to the height h. In other embodiments, a time-of-flight camera, a laser rangefinder, radar or an audible transducer may be used as the height detection device 128 instead of ultrasonic transducer to determine the detected height $h_d$.

It is to be appreciated that height h is the height above the ground 126 which positions the end 120 of the loading platform 104 below loading wheels 130 of the stretcher 106. Suitable loading wheels are described in commonly assigned U.S. Pat. No. 6,203,085, filed Jul. 14, 1999 for DEVICE FOR FACILITATING THE LOADING OF STRETCHER UNDERCARRIAGES INTO AMBULANCES, in which the entire description is herein incorporated by reference. It is to be appreciated that the loading wheels 130 may be motorized in another embodiment. Suitable motorized loading wheels are described in commonly assigned U.S. Pat. No. 8,096,005, filed Dec. 15, 2006 for Device for the assisted loading of stretcher, in which the entire description is herein incorporated by reference.

In one embodiment, the height h is a predetermined height, such as set in memory 132 (FIG. 4A) of the controller 114 to a value selected from the range of 0.4 meters (about 15 inches) to 1 meter (about 39 inches). It is to be appreciated that the range for height h is such to cover the heights at which loading wheels provided on conventional stretchers/cots reach above the ground 126 rolled in their fully upright position.

In an alternative embodiment, the alignment system 102 initiates automatic alignment of the loading platform 104 with loading wheels 130 of the stretcher 106. The controller 114 determines, through optical detection, the position of the loading wheels 130 of the stretcher 106. Once the controller 114 of the alignment system 102 determines the position of the loading wheels 130, the controller 114 then may move the loading platform 104 automatically in multiple directions and angles to level and/or center the front end 120 of the upper support surface 116 with the loading wheels 130 of the stretcher 106, as best depicted by FIG. 3. In this manner, even when the wheeled stretcher 106 is out of alignment with the transport surface 110 (FIG. 1) of the transport vehicle 100, e.g., due to one or both being situated on uneven ground 126 (FIG. 3) placing the transport surface 110 on a different incline and/or at a different height to the stretcher, no additional effort or time is needed to ensure that the stretcher is properly arranged and secured inside the transport vehicle due to such loading conditions. Further, operator no longer must exert additional force or contort their bodies to properly center the stretcher.

Figure 6:
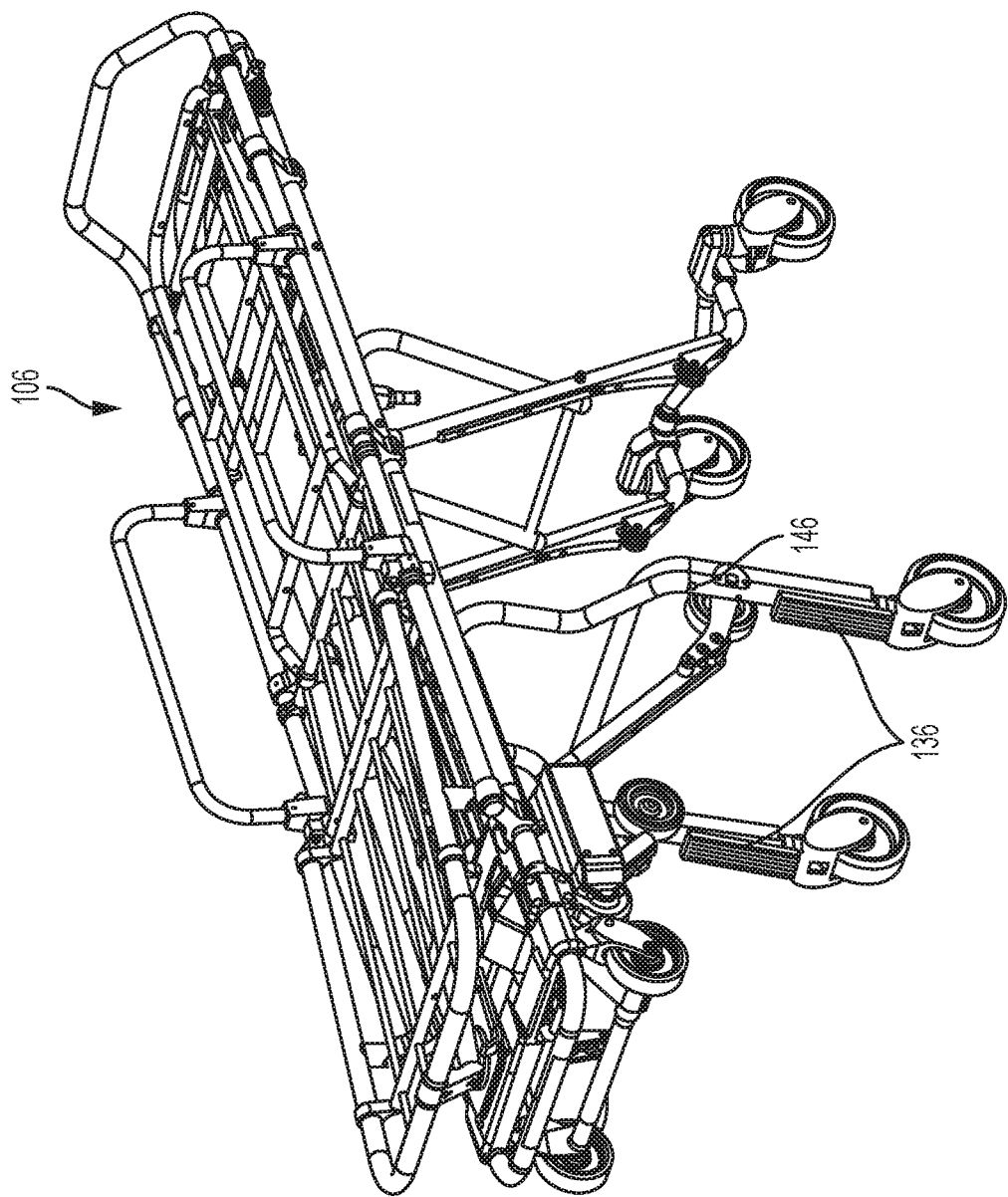
FIG. 6 is an illustration of two active targets provided to a frame member of a wheeled stretcher and used with the alignment system according to FIGS. 1-3 to determine orientation/position of loading wheels associated with the frame member.

In this alternative embodiment, the controller 114 of the alignment system 102 determines the position of the loading wheels 130 by a camera 134. In one embodiment, the camera 134 is provided adjacent the end 120 of the upper support surface 116 (as best shown by FIG. 5A) to enable automatic height adjustment of the upper support surface 116 to a detected height $h_d$ of a target 136. In FIG. 6, the wheeled stretcher 106 includes visual active targets 136 which are provided at a location on the stretcher 106 which corresponds to the bottom end of the wheeled legs of the stretcher 106. The camera 134 captures images of the targets 136 and sends the images to controller 114. The controller 114 analyzes images from the camera 134 and adjusts the height h of the upper support surface 116 to the same relative height of the targets 136 on wheeled stretcher 106, i.e., to height $h_d$ visually detected by camera 134. In an alternate embodiment, camera 134 may be mounted to the transport bay 105 on any structural part that provides the camera with a clear field of view of the targets 136 provided on the stretcher 106, such as e.g., the bumper 124 or roof 138 (FIG. 1) of the emergency vehicle 100. A similar process may be used for the centering the stretcher 106. The camera 134 may capture the targets 136. The controller 114 analyzes images from the camera 134 and adjusts the position of the alignment system 104 on the Y-axis in order to properly center the stretcher 106.

A system view depicting various components of the alignment system 102 is illustrated in block diagram of FIGS. 4A-4B. Controller 114 includes a microprocessor that upon execution of program instructions (such as read from memory 132), adjusts the height and orientation of the end 120 of the loading platform 104 through the platform actuators 112 based interpreting input from the height detection sensor 128, image data from camera 134, and input from positional feedback devices 113 as described above. Generally, height detection sensor(s) 128 measures the height above ground 126 as input for height control of the end 120 and/or upper support surface 116. Platform actuators 112 adjust the height and orientation of the end 120 (and correspondingly, the upper support surface 116) of the loading platform 104. Camera 134 captures image(s) of the targets 136 provided to the stretcher 106 as input for height and orientation control of the end 120 of the loading platform 104. Additional system components are descried hereafter with reference made also to other figures, such as for example, operator inputs which allow an operator to command platform extension and retraction, and transceivers of the alignment system and stretcher which wirelessly pair and communicate for coordination and safety.

Figure 7:
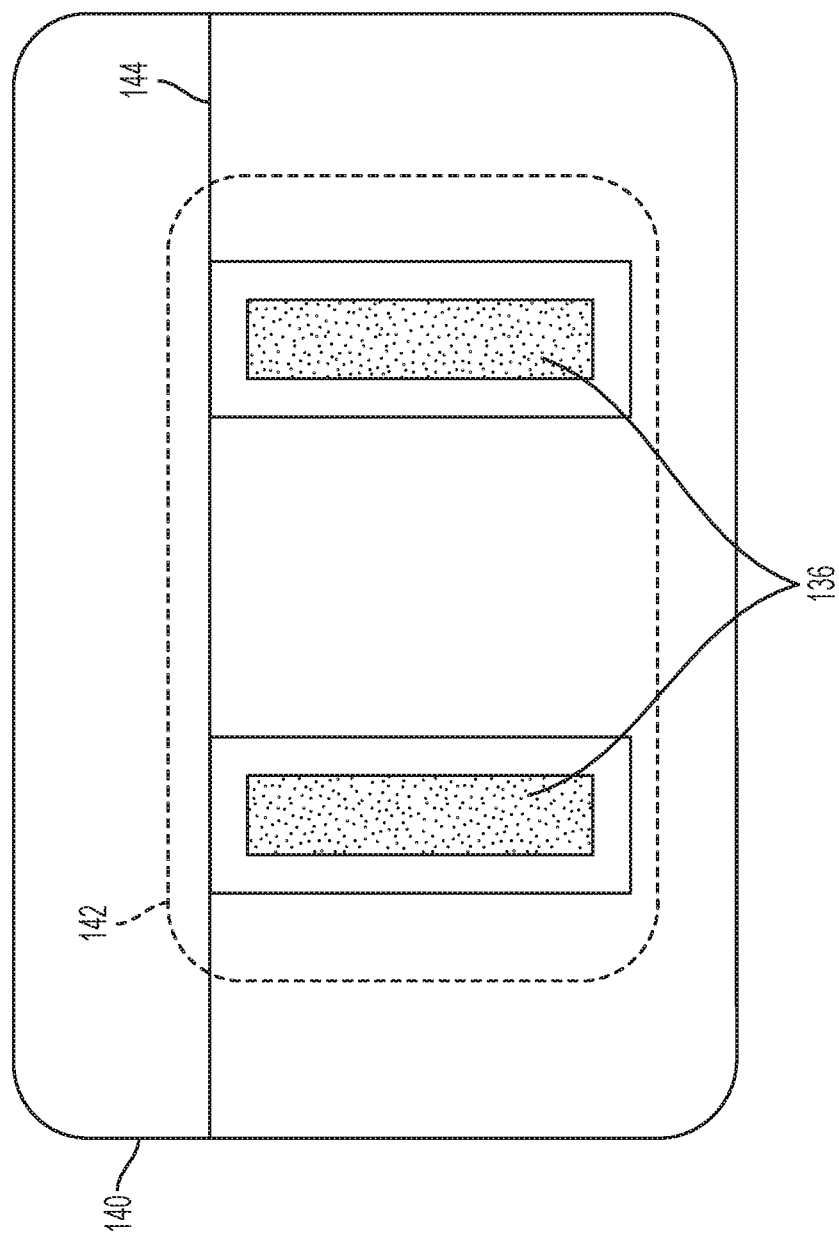
FIG. 7 is an illustration of a field of view of a camera used in the alignment system according to FIGS. 1-3 to detect targets provided to a frame member of a wheeled stretcher.
Figure 8A:
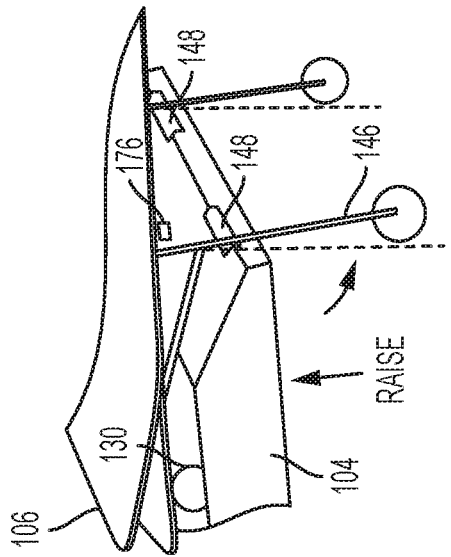
FIGS. 8A, 8B and 8C are illustrations showing when front legs of a wheeled stretcher comes into contact with sensors of the alignment system depicted by FIGS. 1-3 during loading and unloading.

FIG. 7 depicts an illustrated field of view 140 of the camera 134 as well as an auto tracking window 142 and a height reference line 144 for providing a visual indication of height h to the controller 114. The wheeled stretcher 106 when rolled along the ground 126 to a position within about 0.5 to 2 meters of the end 120 (FIG. 6) of the upper support surface 116 such that the targets 136 are detected sufficiently in the field of view 140 of the camera 134 to capture the target's image in the auto tracking window 142. After the target's image is captured, the controller 114 (FIG. 2) upon receiving the image from the camera then calculates from the captured image a detected relative difference(s) in the position and orientation of the height reference line 144 to the position and orientation of the target 136 in the auto tracking window 142 as well as a difference, if any, in the detected target 136 to being centered, side-to-side, in the auto tracking window. The controller 114 then signals automatically the necessary corrections to the system to adjust the position and orientation of the upper support surface 116 such that the height reference line 144 is aligned in height (e.g., $h=h_d$) and made parallel with the targets 136, e.g., along the longitudinal length at the bottom, middle or top of the targets 136. Additionally, the loading platform 104 is adjusted automatically by the controller 114 such that the targets 136 are centered, side-to side, in the auto tracking window 142. Once aligned, the controller 114 continually updates this alignment until front legs/loading legs 146 of the stretcher 106 touch the front end 120 of the loading platform 104. It is to be appreciated that in one embodiment one or both of the front legs 146 are detected and signaled to the controller 114 by one or more contact sensors 148, such as, e.g., one or more touch plates, pressure plates, contact switches, magnetic switches, reed switches, a light beam, camera, etc., of the loading platform 104 as depicted by FIG. 8A. In another embodiment, the controller 114 may continually adjust the upper support surface 116 until some aspect of the target 136, such as e.g., side-to-side width or top-to-bottom height, fall visually outside (i.e., larger than) the auto tracking window 142.

It is to be appreciated that as the controller 114 aligns automatically the reference line 144 in both its position and orientation with some aspect of the detected target 136 and also makes the target 136 centered, side-to-side, in the target tracking window 142, correspondingly the height and orientation of the upper support surface 116 is such that the loading wheels 130 of the stretcher are also aligned in position and orientation such that they can be easily roll onto the upper support surface 116 without any of the attending personnel needing to lift the stretcher 106 for alignment purposes. In other words, after the orientation of the loading wheels 130 of the stretcher 106 is determined, via target detection, the controller 114 automatically positions the loading platform 104 to have the top of the front end 120 in the same plane as the bottom surface of the loading wheels 130. Moreover, it is to be appreciated that by the controller 114 adjusting the alignment of the loading platform 104 such that the reference line 144 is level with the target 136, and the target is centered in target tracking window 142, the loading wheels 130 are correspondingly aligned properly with the upper support surface 116 such that the stretcher 106 may then be moved onto the loading platform 104 and transitioned thereon into the emergency transport vehicle 100 as explained hereafter in a later section. Lastly, it is to be appreciated that the auto tracking window 142, the reference line 144, and at least the image of the target 136 may be shown on a display 150 (FIG. 4A) to an operator, if desired. It is to be appreciated in another embodiment, the camera 134 only recognizes the active targets 136 and actuates the alignment system to be centered side-to-side with the stretcher. The height of the platform is checked both by the ultrasound device and the camera. The movements that the platform are able to make in this embodiment are: extraction/retraction, height adjustment, laterally adjustment (centering side-to-side), and inclination on Z-axis to auto leveling the position. Other movements or adjustments in this embodiment are not implemented.

Figure 8B:
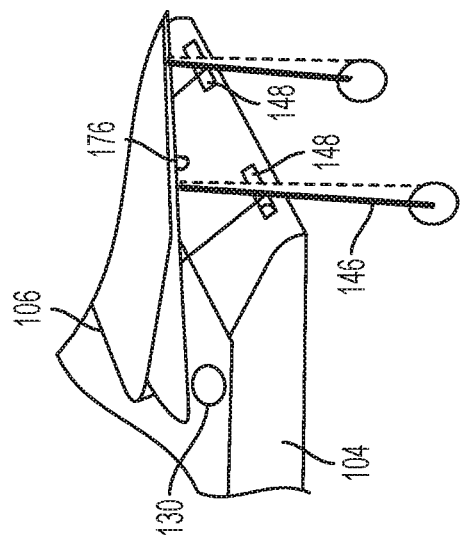
Figure 8C:
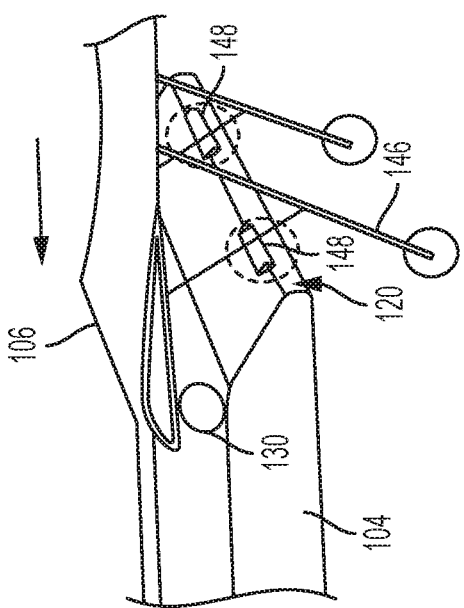

With reference to FIGS. 8A-8C, two particular actions that may be performed by the controller 114 are discussed hereafter. One of these actions is to incline and/or center the loading platform 104 to accept the front wheels of the stretcher 106 as explained in the embodiment above. In another embodiment, the other action occurs during the actual loading of the stretcher 106 onto the loading platform 104 when the attendant is pushing the stretcher 106 onto the loading platform 104. When the front legs 146 of the stretcher 106 touch the front end 120 of the loading platform 104, one or more contact sensor 148 of the loading platform 104 may detect the contact of the front legs 146 with the loading platform 104 to indicate to the controller 114 that automatic adjustment of the loading platform is to cease. In still another embodiment, in addition to or alternatively, the loading platform 104 may detect when the stretcher 106 has been loaded upon the loading platform 104 and the front legs 146 have folded inward against stretcher 106. This detection may be accomplished via another contact sensor(s) 152, such as one or more touch plates, pressure plates, contact switches, magnetic switches, reed switches, a light beam, camera, etc., detecting the loading wheels 130 or any other suitable portion/part of the stretcher 106 at a predetermined location on the loading platform to indicate that the front legs 146 have folded inward against stretcher 106 and the loading wheels 130 are supported on the loading platform 104. The sensors 152 may also sense whether the legs 146 are extended or folded. In some embodiments, the sensors 152 may be on board the stretcher 106 to check if the legs are fully closed/folded or not. Upon the controller 114 receiving an indication (signal) from the one or more contact sensors 152 of the presence of the front legs 146 and/or a signal from the contact sensor(s) indicating that the loading wheels 130 are at the predetermined location which indicates that the front legs 146 have folded inward against stretcher 106 as depicted by FIG. 8B, the controller 114 maintains the current height of the loading platform 104 such that the loading of the stretcher 106 can be completed without any further height adjustments, and there afterwards that the loading platform 104 may be commended to retract automatically back fully into transport vehicle 100 as discussed hereafter. The contact sensors 152 are may be operational when the legs 146 are fully open. When the contact sensors 152 are closed (the legs are ready for the folding phase during the loading of the platform 104), the controller 114 receives the signal and actuates the platform 104 to facilitate the loading process. The controller 114 may raise the platform 104 to lift the stretcher 106 in order to facilitate the folding of the legs 146. When the legs 146 are partially folded the platform 104 may descend to facilitate the loading of the stretcher 106 avoiding any need for the operators to exert additional force. While unloading, when the stretcher 106 is on the platform 104 and the contact sensors 152 are fully closed, the controller 114 may adjust the height of the platform 104 according to the distance from the ground 126 and positions the end 120 of the platform 104 so that legs 146 may fully open without touching the ground 126. Contact sensors 152 may warn operators if eventually the legs 146 are not fully open during the unloading avoiding dangerous conditions for both patient and operators.

After the stretcher 106 has been moved onto the loading platform 104, the loading platform 104 may then move to a final position. In an embodiment, this final position is generally provided to one side or centered within the transport vehicle 100 to allow room for medical personnel to attend to a patient. In another embodiment, the final position is the original position of the loading platform 104 within the transport vehicle 100.

As discussed above previously, the loading platform 104, when active, may extend past the bumper 124 of the transport vehicle 100, i.e., beyond extremity 122 (FIG. 2). This ability to extend past the bumper 124 allows back legs/trailing legs 154 (FIG. 2) of the stretcher 106 to remain open and in contact with the ground 126 during the loading of the stretcher 106 into the transport vehicle 100.

Referring back to FIG. 5A, the loading platform 104 may be commanded manually to move by an operator through operator inputs 156, such as by multifunction buttons 158, 160, e.g., press button combinations, joysticks each with a press function, combinations thereof, etc., provided to one or both sides of the loading platform 104. The loading platform 104 may include visual or acoustic indicators, e.g., via buttons 158, 160 being capable of providing such an indication (which is illustrated by the dashed lines circling each button 158, 160 in FIG. 5A), such that the controller 114 can signal to operators error causing issues with either the alignment or the loading. For example, the error causing issues may include an inability to move into proper alignment with the stretcher after a pre-determined time, a fault/non-response detected in one of the actuator via the feedback device, inadequate power to carrier out a requested operation.

As depicted by FIG. 5B, actuating one of the operator inputs 156, namely button 158, causes the loading platform 104 to extend out from the transport bay 105, and optionally raise/lower, pitch, and/or tilt automatically under control of the controller 114 to an initial loading position from an initial starting position. Likewise, as depicted by FIG. 5C, actuating the other of the operator inputs 156, namely button 160, causes the loading platform 104 to retract/return back into the transport bay 105, and optionally raise/lower, pitch and/or tilt back under control of the controller 114 to the initial starting position, such as, e.g., to one side of or centered in the transport bay 105.

It is to be appreciated that the loading platform 104 extents or retracts while the respective one of the operator inputs 156 is continually actuated, e.g., pressed, to ensure that extending or retracting of the loading platform 104 is an intended act of the operator. Additionally, it is to be appreciated that the initial loading position in one embodiment, as explained in a later section, is a position which signals to the controller 114 that automatic adjustment of the orientation and height of the loading platform 104 is to commence. This manual commanding to extend or retract via the respective one of the operator inputs 156 may also be used by the operator in the case when the automatic alignment fails. The loading platform 104 may be further configured to be lifted, tilted, translated, or otherwise moved by medical professionals within the transport vehicle 100, via the operator inputs 156, or via another user interface, such as controller panel (not shown) provided in the transport vehicle 100, to better tend to the patient after the loading platform 104 has been loaded with stretcher and/or the patient.

It is be appreciated that the location and orientation of the initial loading position as well as the initial starting position can be either pre-programmed (i.e., factory set) or programmed (i.e., by an operator) and read from memory 132 by the controller 114 for carrying out upon actuating the respective one of the operator inputs 156. For example, the initial loading position may be programmed into memory 132 by positioning and orientating the loading platform 104 in a desired extended position, and then following a programming sequence, such as pressing both buttons 158 and 160 simultaneously for longer than a period of time, e.g., 7 seconds, and then pressing the corresponding one of the operator inputs 156, i.e., pressing button 158 to set the current position and orientation in memory 132.

With reference now made to FIGS. 9 and 10, communications between loading platform 104 and stretcher 106 may be provided in one embodiment via a recognition/control device 162 being provided on the stretcher 106. The recognition/control device 162 has a processor 164 (FIG. 12) which controls a communications device/transceiver 166 also provided on the stretcher 106. The processor 164 of the control device 162, via communicating device 166, provides to and receives from the controller 114 of the alignment system 102 a communications signal 170 via a transceiver 168 provided on the loading platform 104. In an embodiment, the transceivers 166, 168 implement short-range wireless communications, such via infrared, Bluetooth, Wi-Fi (IEEE 802.11a, b, g, n, etc.), Zigbee (IEEE 802.15.4), Ultra-Wideband, and the likes. In another embodiment, the controller 114 and processor 164, via the transceivers 166, 168, pair using a unique identifier. In another embodiment, the pairing is conducted via Wi-Fi, such that the transmission of signal 170 containing the unique identifier is oriented and unobstructed in the direction of the stretcher 106 between the source and recipient, and vice versa. In an embodiment, the pairing may be constant or intermittent, and the communication between the alignment system 102 and the recognition/control device 162 may further be encrypted or otherwise confidential.

The recognition/control device 162 may further be provided with a visual indicator 172, such as a multicolor light, to indicate status of the loading process, and a command input 174, such as a button or switch biased to one position, e.g., an off position such that the operator would have to hold the button or switch in an active/on position until the loading is complete. It is to be appreciated that the visual indicator 172 may provide a light signal of any color, duration, frequency, or intensity. For example, in an initial condition, wherein the stretcher 106 is not loaded into the transport vehicle 100, the operator may indicate start to the loading process via applying stimulus to the command input 174, e.g., pressing and holding a start button or a switch to a start position, on the device 162. Once start of the loading process is commanded, the processor 164 of the control device 162, via communicating device 166, provides an "extend" communications signal 170 (in one embodiment, after pairing) to the controller 114 of the alignment system 102, which is received via a transceiver 168. The controller 114 of the alignment system 102 then initiates the extending of the loading platform 104 to the initial loading position as mentioned above previously, and communicates such to the processor 164 of device 162. At this point in the loading process, based on further communicates from controller 114, via signal 170, the processor 164 may signify via indicator 172, e.g., illuminating a green color, that the loading platform 104 is currently extending out of transport vehicle 100 or moving to be in orientation with stretcher 106. If the user removes the stimulus from the command input 174, the processor 164 after communicating such to the controller 114 and receiving a reply, may signify via indicator 172, e.g., illuminating a flashing amber color, that the loading platform 104 has not moved to the initial loading position or that the controller 114 does not visually see, via input from camera 134, the target 136 provided on the stretcher 106. The user may continue the loading process by re-introducing the stimulus to the command input 174, or if necessary positioning the stretcher 106 in such a way that the target 136 is detected by the alignment system 102, as explained above previous sections. Additionally or alternatively, the visual indicator 172 may provide any other system of colors, durations, or orders of visual indication that an operator may find useful and understandable.

In one embodiment of the invention, the recognition/control device 162 is removable. In another embodiment, the recognition/control device 162 is built into the stretcher 200. In another embodiment of the system, the processor 164 of the recognition/control device 162 receives from a height detection device 176 that is provided on the stretcher 106, e.g., adjust the loading wheels 130, a detected height above the ground 126, and communicate such and/or a corresponding height of the loading wheel 130 to controller 114 for alignment purposes and to signal any irregularities in the location of the ground 126. It is to be appreciated that the height detection device 176 may be any one of devices suitable for use as those for height detection device 128.

Figure 11:
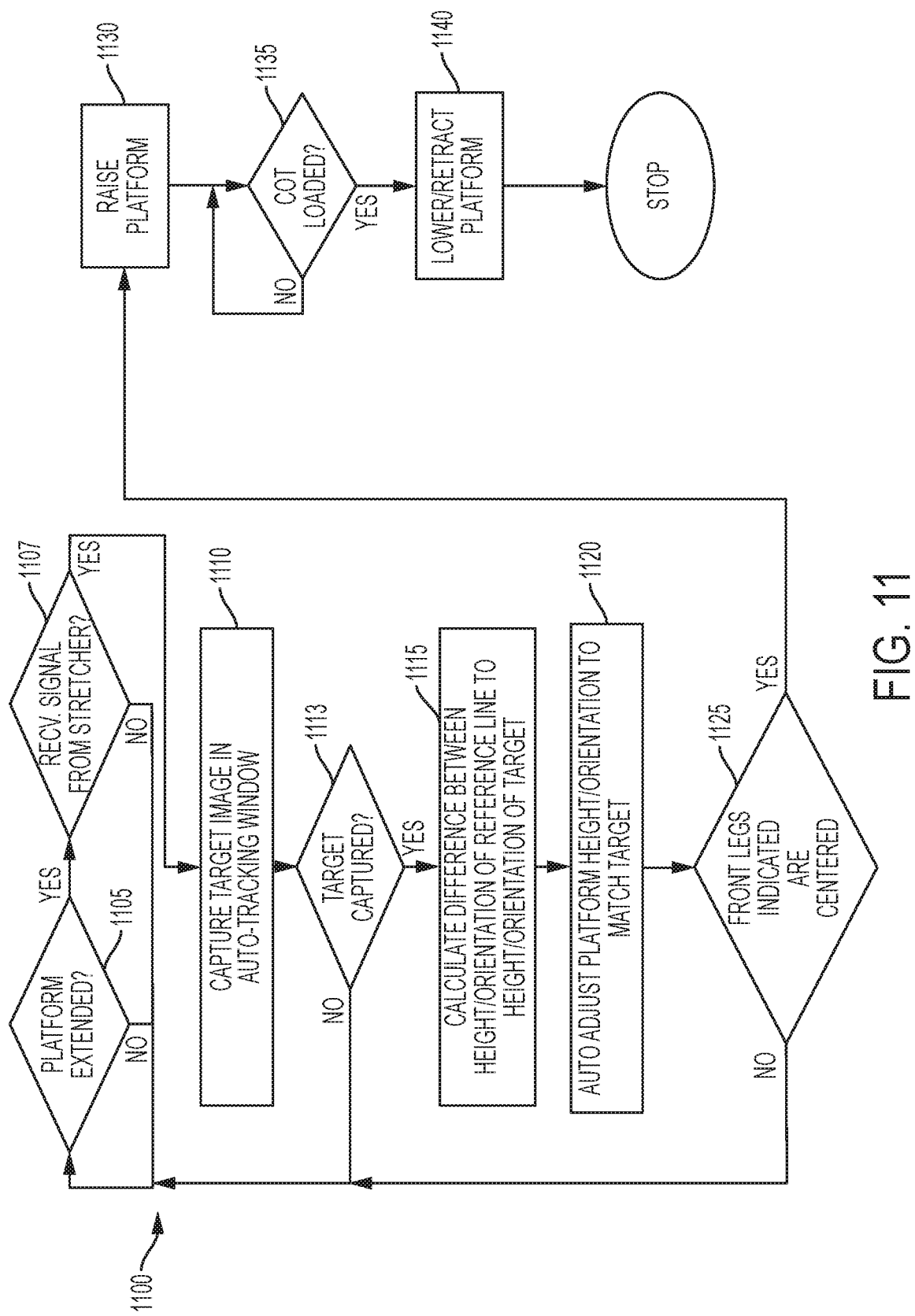
FIG. 11 is a flow chart that outlines a method for automatic height/orientation control for a loading platform used in an emergency transport vehicle.

FIG. 11 is a flow chart that outlines a method for automatic height/orientation control for a loading platform used in an emergency transport vehicle, generally reference as symbol 1100. In process step 1105, the controller 114 automatically determines whether the upper support surface 116 is extended beyond the extremity 122 of the transport vehicle 100. In one embodiment, input to the controller 114 to make this determination may be, via a line encoder attached to the upper support surface 116 and/or input from height detector 128 indicating a height greater than, e.g., that to the rear bumper 124. In process step 1107, the controller 114 determines whether a signal 170 is being received from the recognition/control device 162 indicating that the operator is commanding loading of the stretcher 106 via activation of the command input 174. If the command input 174 is activated (stimulated), then in process step 1110, the camera 134 captures the targets 136 in the auto tracking window 142, otherwise the controller 114 continues to wait for such a signal from the recognition/control device 162. If the targets 136 are not captured which is sufficient in any manner for processing by the controller in step 1113, e.g., blurred, obstructed, to small, etc., then the process step 1113 loops back to process step 1105 until a suitable image of the targets is captured by the camera 134. After a suitable image of the targets 136 is captured by the camera 134 for processing by the controller 114, then in process step 1115, the controller 114 automatically calculates a difference, if any, between the height and orientation of the reference line 144 to the height and orientation of the detected targets 136 in the auto tracking window 142. Next, in step 1120, the controller 114 automatically adjusts the end 120/upper support surface 116 of the loading platform 104, via commanding the adjustment of the platform actuators 112 to pitch, tilt, raise and/or lower, such that the reference line 144 is level with the targets 136 as explained above in a previous section. Next, the controller 114 runs a check in step 1125 to see if the stretcher/cot legs 146 have engaged the contact sensors 148 (and/or sensors 152) and/or whether a signal is received from recognition/control device 162 indicating that contact has been made. If the controller 114 receives input from the contact sensors 225 and/or the detection device 176 that there is contact between the loading platform 104 and the stretcher 106, then the controller 114 ceases the automatic adjusting method and in an embodiment as explained hereafter, raises the loading platform in process step 1130. Otherwise, these process steps loop back to process step 1105 and repeats again until the stretcher is loaded as indicated by sensors 148 and/or 152 and checked in process step 1135, and/or the platform is retracted back in process step 1140, via release of the command input 174 and/or pressing of return/retract button 160, into the bay 105 of the emergency transport 100.

Figure 12:
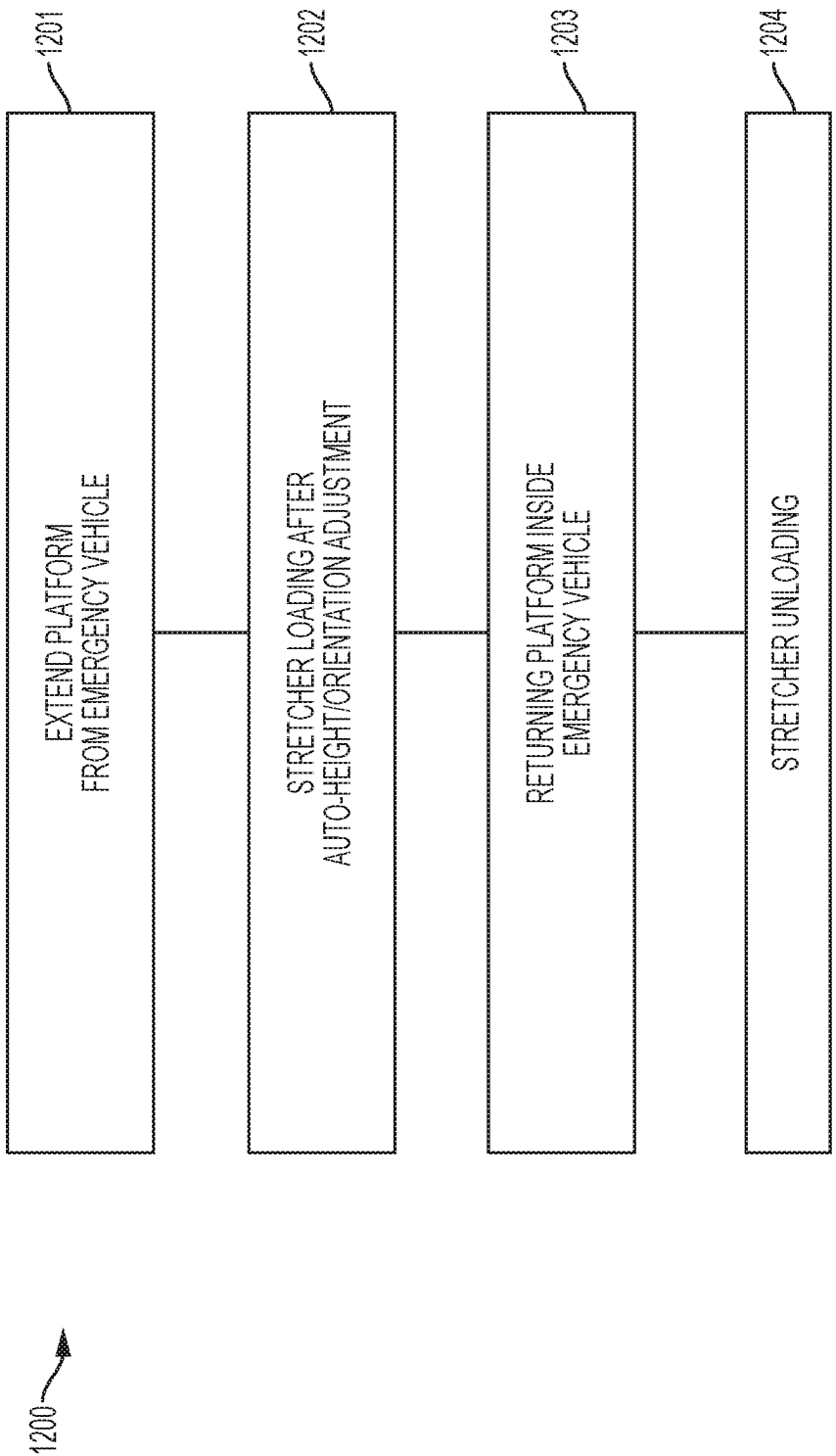
FIG. 12 depicts a method of loading and unloading a wheeled stretcher to and from an emergency transport vehicle.

Hereafter, with reference made also to FIG. 12, a method 1200 of loading and unloading a wheeled stretcher to and from an emergency transport vehicle, such as an ambulance provided with a loading platform and carried out by an operator with assistance from the alignment system 102 according to an embodiment of the invention, is disclosed.

Step 1201. Extension of the Platform

It is to be appreciated that the initial conditions before carrying out the above mentioned method is that the back door of the emergency transport vehicle 100 is open and the loading platform 104 is in a "static" condition. By the term "static condition" it is meant that the loading platform is not in the process of loading or unloading, and thus the operator inputs 156 on the loading platform 104 are illuminating the color green. It is to be appreciated that a separate visual or audible indicator may be provided, instead of or in addition to, operator inputs 156 for providing the indications as discussed herein.

To start the loading phase, the operator pushes and keeps pushed the "extension" button 158. The light signal provided on the loading platform 104 flashes a first color, e.g., yellow, which indicates to the operator the "extension" button must be keep pressed until the initial positioning of the loading platform finishes. Additionally, an acoustic signal may indicate that the platform is moving. If the operator releases the "extension" button 158, the loading platform 104 stops immediately, the acoustic signal (which is provided to indicate movement) stops and the light signal remains flashing the first color in order to indicate that the operation is not finished. The operator may then continue the movement by pushing again the "extension" button 158 or may cancel the "extension" operation by pushing the "return" button 160 such that the platform returns back into the ambulance to the initial position.

When the initial positioning of the loading platform 104 is finished, e.g., reaching the initial loading position, the signal light on the loading platform 104 will display the first color again as a fixed color, e.g., fixed color yellow. It is to be appreciated that during the initial positioning, while the loading platform 104 is extending outside the vehicle 100, the loading platform 104 is centered with respects to its base 108, and if necessary rises or lowers vertically to remain at predetermined height at the loading end 120 of the loading platform 104 with respects to the ground 126 as detected by the height detection device 128, as previously explained above.

Step 1202. Stretcher Loading

The operation of loading is described. Firstly, as an initial condition, there is no light signal provided by the indicator 172 on the stretcher 106. When the operator stimulates the command input 174, e.g., via presses a button, the processor 164 of the control device 162 performs the operation of pairing. This operation permits a communication link to be created between the control device/stretcher and the controller/platform which is not affected by other nearby wireless systems. The pairing is established as follows: the control device 162 on the stretcher 106 transmits to the alignment system 102 a unique identifier ID via the communications signal 170. The confidentiality of the communication is guaranteed by the ID acquired during pairing. In one embodiment, the communication is established initially via transmission of the signal 170 being a beam that is oriented in the direction of the platform, such that pairing is only established so long as the loading wheels 130 of the stretcher 106 and the end 120 of the loading platform 104 are facing each other. Such pairing may be implemented via a direct line-of-sight method, for example, via Wi-Fi. After the pairing, remaining communications between the controller 114 of the alignment system and the processor 164 of the control device 162 may be facilitated via RF, Wi-Fi, Zigbee, Bluetooth, or Ultra-Wideband communications. Additionally, such communications may be time-sharing, which means that the data exchanged occupy a channel for a brief period of time, allowing other communications on the same channel.

Once paired, the visual indicator 172 on the control device 162 flashes the color yellow. This flashing color yellow indicates to the operator that stimulation to the command input 174 must remain until the loading phase is finished. With the command input 174 indicating to the processor 164 to continue signaling to the controller 114 the loading of the stretcher 106, the controller 114 will position and orientation the end 120 of the loading platform 104 relative to the loading wheels 130 as explained previously above in earlier sections. As mentioned, the consent to the movements of the loading platform 104 is under the control of the operator via the continued stimulus applied to the command input 174, e.g., continued pressing/holding of a button/switch. If the operator does not continue applying the stimulus to the command input 174, movement of the loading platform 104 will stops immediately. At which point, or if the controller 114 of the alignment system 102 detects, via input from one of it sensors/feedback devices, a particular condition that avoids positioning and/or orientating the loading platform properly with the target 136, the visual indicator 172 (upon a communication signal from controller 114 to processor 164) will illuminate with a second color, e.g., the color red, to indicate such a condition to the operator.

When the front legs 146 (head/loading end) of the stretcher 106 touch the sensor(s) 148 of the loading platform 104 and the loading wheels 130 are on the loading platform, the controller 114 maintains the loading platform 104 in its current position, or in an alternative embodiment rises the loading platform 104 approximately 5 centimeters (1.97 inches) to start the closing and the loading of the front legs 146 as depicted by the leg transitioning indicted from FIG. 4A to FIG. 4B. In such an alternative embodiment, upon the controller 114 detecting the pressure of at least one of the loading wheels 130 on the loading platform 104, via contact sensor(s) 148 and/or an additional sensor 152, indicating that the front legs 146 have overcome the vertical, the controller 114 then lowers loading platform 104 back to the previous position to facilitate the closing of the front legs 146 and complete loading of the stretcher 106 onto the loading platform 104.

In still another embodiment, a leg detection device 178 may be provided on the stretcher 106 in order to indicate to the controller 114 (via a standalone transmitter or transceiver 164 as described previously above) and/or processor 164, when the vertical position of the front legs 146 is detected. For example, the detection may be performed by a moving component of the stretcher 106 associated with the closing of the front legs, such as for example, a guide on which a closing mechanism carrier for the legs slides, contacting the leg detection device 178 positioned on stretcher 106 when the front legs 146 reach the vertical position. The leg detection device 178 in one embodiment is a micro-switch, and in other embodiments may be a reed switch associated with a magnet provided on the moving component of the stretcher that is associated with the front leg, a light or laser beam which gets interpreted when the front legs reach vertical, and any other detection device which can indicate when a moving component of the stretcher 106 is in a position, starting from a previous position, which corresponds to the front legs being at or slightly passed (<+5 degrees) vertical when being folded during loading onto the loading platform 104. In an embodiment, when the stretcher 106 the loading wheels 130 are motorized, the processor 164 automatically activates the motor (not shown) of the loading wheels for easy loading upon receiving the indication from the leg detection device 178 that the front legs 146 have reached vertical. In such an embodiment, the processor 164 continues with the activation of the motor of the motorized loading wheels 130 for as long as the command input 174 of the recognition/control device 162 is stimulated, e.g., pressed, and/or upon the same (or a second, similar) leg detection device detects the rear legs 154 (FIG. 1) being in a folded position. At this point, with the stretcher 106 fully loaded onto the loading platform 104, the visual indicator 172 stops flashing and remains a fixed color, e.g., yellow, to indicate to the operator that it is not necessary to continue with the stimulation to the command input 174, e.g., pressing the button, as the operation of loading of stretcher onto the loading platform is now completed.

Step 1203. Returning Platform Inside the Vehicle

It is to be appreciated that in an embodiment, the color, e.g., yellow, indicated by the visual indicator 172 remains such until after the loading platform is retracted/returned back inside the transport vehicle 100 to the initial starting position. As described above previously, the operator presses the "return" button 160 positioned on the side of the loading platform 104 to make the loading platform 104 goes back inside the transport vehicle 100 as depicted by FIG. 5B. When the retract/return operation of the loading platform 104 is fully completed, the visual indicator 172 becomes a second color, e.g., green, to indicate (upon a signal from the controller 114 as detected and indicated thereto by the positional feedback devices 113) that the retraction/return of the loading platform 104 to the initial starting position is completed.

Step 1204. Stretcher Unloading

To unload the stretcher 106 from the loading platform 104, the operator repeats the process described above with regard to Step 1, "Extension of the platform." After the loading platform 104 has finished with its height adjustment based on the detection of the ground 126 as also previously discussed above and during the unloading of the stretcher 106 therefrom, in the illustrated embodiment, the rear legs 154 (FIG. 1) open firstly and then the front legs (head-end). Accordingly, in an embodiment, the adjustments of the loading platform may likewise function in the opposite manner as described above. For example, when the front legs 146 overcome the vertical (see FIG. 8C), i.e., based upon an indication from the detection device 176 and/or contact sensors 148, the loading platform 104 then lowers in order to facilitate the complete opening of the front legs 146 and the correct unloading of the stretcher 106. When the lowering of the loading platform 104 is completed, the visual indicator 172 (FIG. 8) on the stretcher 106 stops to flash and becomes the fixed color, e.g., yellow, to indicate that the operation is not completed. At this point the operator can decide either to leave the loading platform 104 in the extended position in order to re-load the stretcher 106 or to return the platform inside the ambulance via the retract/return button 160.

It is to be appreciated that certain processes/functions describe by the various methods herein are implemented by program instructions that are stored in memory, and then read therefrom and executed by the controller 114 and processor 164. It is to be further appreciated that program instructions (i.e., computer programs) based on the written description and flow charts of this invention are within the skill of an experienced developer. The various software components, functions, programs and/or program modules described in this application may be created using any of the techniques known to one skilled in the art or can be designed in connection with existing software, and implemented as software code to be executed by a processor, such as e.g., controller 114 and processor 164, using any suitable computer language. For example, computer-executable/program instructions may be compiled or interpreted from computer programs created using a variety of programming languages and/or technologies, including, without limitation, and either alone or in combination, Java™, C, C++, Visual Basic, Java Script, Perl, etc. The software code may be stored as a series of instructions or commands in computer readable medium (also referred to as a processor-readable medium) which includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus/ network communicatively coupling together the processor, the memory, and the various inputs and outputs thereto, such as sensors 113, 128, 148, 152, 134, user interfaces/inputs 150, 156, and communication/transceiver 168 of the alignment system 102. Some forms of non-transitory computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a processor/controller can read. Likewise, any data generated and described herein may be stored, accessed, and retrieved from memory of the alignment system using a file system, an application database in a proprietary format, a relational database management system (RDBMS), etc, via a computing device employing a computer operating system such as one of those mentioned above, and may accessed the memory of the alignment system 102 in any one or more of a variety of manners, as is known. A file system may be accessible from a computer operating system, and may include files stored in various formats. An RDBMS generally employs the Structured Query Language (SQL) in addition to a language for creating, storing, editing, and executing stored procedures, such as the PL/SQL language.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An alignment system for loading a wheeled stretcher into an emergency transport vehicle, the alignment system comprising:
    a loading platform configured to fit within the emergency transport vehicle;
    at least one sensor configured to detect a position of the wheeled stretcher relative to at least one of (a) the emergency transport vehicle and (b) a surface adjacent a loading end of the emergency transport vehicle and upon which at least one of the wheeled stretcher and the loading platform may be placed;
    a controller; and
    at least one actuator responsive to an input signal from the controller and cooperative with the loading platform such that upon receipt by the controller of a signal received from the at least one sensor and determination by the controller that the wheeled stretcher is not in alignment with the loading platform, program instructions executed by the controller cause the at least one actuator to move the loading platform in order to substantially align the loading platform with the wheeled stretcher through at least one of automatic leveling and automatic centering of the loading platform.

2. The alignment system of claim 1, wherein the at least one sensor comprises a height detection sensor communicatively coupled to the controller and placed relative to an end of the loading platform in order to detect a height of the loading platform above a surface upon which the wheeled stretcher is placed.

3. The alignment system of claim 2, wherein the at least one sensor further comprises a camera that is communicatively coupled to the controller such that upon capture of a target image corresponding to the wheeled stretcher by the camera and a determination by the controller of a difference between height and orientation of a reference line that corresponds to an end of the loading platform and height and orientation of the target image, program instructions executed by the controller cause the at least one actuator to automatically move the loading platform in at least one degree of freedom.

4. The alignment system of claim 3, wherein the at least one degree of freedom used to align the loading platform to the reference line is selected from the group consisting of loading platform pitch, loading platform tilt, loading platform raise, loading platform lower and combinations thereof.

5. The alignment system of claim 3, wherein the at least one sensor comprises a contact sensor such that upon receipt of a signal therefrom by the controller, program instructions executed by the controller cause the at least one actuator to cease movement of the loading platform.

6. The alignment system of claim 1, further comprising operator inputs provided on at least one of the loading platform, the wheeled stretcher and the emergency transport vehicle to send a command to the controller to extend or retract the loading platform.

7. The alignment system of claim 1, wherein the at least one sensor comprises a camera.

8. The alignment system of claim 1, wherein the at least one sensor comprises a contact sensor such that upon receipt by the controller of a signal received from the contact sensor, program instructions executed by the controller cease movement of the loading platform.

9. The alignment system of claim 1, wherein the at least one sensor comprises a plurality of sensors selected from the group consisting of a camera, a height detection sensor, a contact sensor and combinations thereof.

10. The alignment system of claim 1, wherein the at least one actuator is configured to have multiple degrees of freedom movement.

11. The alignment system of claim 10, wherein the multiple degrees of freedom movement comprises six degrees of freedom.

12. A non-transitory computer readable medium with program instructions that when read and executed by a processor cause the processor to:
- upon receipt of a wheeled stretcher position signal from at least one sensor, determine that the wheeled stretcher is not in alignment with a loading platform of an emergency transport vehicle; and
- send a control signal to at least one actuator that is cooperative with the loading platform to move the loading platform in at least one degree of freedom of movement of in order to substantially align the loading platform with the wheeled stretcher through at least one of automatic leveling and automatic centering of the loading platform.

\* \* \* \* \*